US011929090B2

(12) United States Patent
Lin et al.

(10) Patent No.: US 11,929,090 B2
(45) Date of Patent: Mar. 12, 2024

(54) METHOD AND APPARATUS FOR MATCHING AUDIO CLIPS, COMPUTER-READABLE MEDIUM, AND ELECTRONIC DEVICE

(71) Applicant: TENCENT TECHNOLOGY (SHENZHEN) COMPANY LIMITED, Guangdong (CN)

(72) Inventors: Fang Chao Lin, Shenzhen (CN); Wei Biao Yun, Shenzhen (CN); Peng Zeng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 448 days.

(21) Appl. No.: 17/336,562

(22) Filed: Jun. 2, 2021

(65) Prior Publication Data

US 2021/0287696 A1    Sep. 16, 2021

Related U.S. Application Data

(63) Continuation of application No. PCT/CN2020/091698, filed on May 22, 2020.

(30) Foreign Application Priority Data

May 24, 2019 (CN) .......................... 201910441366.5

(51) Int. Cl.
*G10L 25/54* (2013.01)
*G10L 25/27* (2013.01)
*G10L 25/51* (2013.01)

(52) U.S. Cl.
CPC .............. *G10L 25/51* (2013.01); *G10L 25/27* (2013.01)

(58) Field of Classification Search
None
See application file for complete search history.

(56) References Cited

U.S. PATENT DOCUMENTS

2007/0048695 A1    3/2007 Huang
2007/0131094 A1*   6/2007 Kemp ..................... G06F 16/68
                                               707/E17.101
(Continued)

FOREIGN PATENT DOCUMENTS

CN    103871426 A    6/2014
CN    106935248 A    7/2017
(Continued)

OTHER PUBLICATIONS

Extended European Search Report dated Jul. 7, 2022 in European Application No. 20815214.0.
(Continued)

*Primary Examiner* — Seong-Ah A Shin
(74) *Attorney, Agent, or Firm* — Sughrue Mion, PLLC

(57) ABSTRACT

A method for matching audio clips includes: obtaining a first feature sequence corresponding to a first audio clip and a second feature sequence corresponding to a second audio clip; constructing a distance matrix, elements in the distance matrix representing respective distances between first positions in the first feature sequence and second positions in the second feature sequence; calculating a first accumulation distance between a start position and a target position in the distance matrix, and calculating a second accumulation distance between an end position and the target position in the distance matrix; and calculating a minimum distance between the first feature sequence and the second feature sequence based on the first accumulation distance and the second accumulation distance, and determining a degree of (Continued)

matching between the first audio clip and the second audio clip according to the minimum distance.

20 Claims, 7 Drawing Sheets

(56) References Cited

U.S. PATENT DOCUMENTS

| | | | |
|---|---|---|---|
| 2012/0232899 A1* | 9/2012 | Koval | G10L 17/14 704/E15.001 |
| 2014/0259041 A1* | 9/2014 | Sharifi | G10L 25/57 725/18 |
| 2014/0366710 A1* | 12/2014 | Eronen | G10H 1/00 84/609 |
| 2015/0199974 A1* | 7/2015 | Bilobrov, I | G10L 19/018 700/94 |
| 2015/0221321 A1* | 8/2015 | Christian | G10L 25/48 700/94 |
| 2017/0294185 A1* | 10/2017 | Bradley | G10L 15/14 |
| 2018/0233162 A1* | 8/2018 | Venkataramani | G11B 27/031 |
| 2018/0254054 A1* | 9/2018 | Whalen | G10L 25/27 |
| 2019/0115044 A1* | 4/2019 | Du | G10L 25/51 |
| 2021/0165827 A1* | 6/2021 | Li | G10L 25/54 |

FOREIGN PATENT DOCUMENTS

| | | |
|---|---|---|
| CN | 108417226 A | 8/2018 |
| CN | 109192223 A | 1/2019 |
| CN | 109493853 A | 3/2019 |
| EP | 0 103 258 A1 | 3/1984 |
| JP | 57-27299 A | 2/1982 |
| JP | 59-45583 A | 3/1984 |
| JP | 61-292697 A | 12/1986 |
| JP | 62-144200 A | 6/1987 |
| JP | 62-147496 A | 7/1987 |
| JP | 2000-347659 A | 12/2000 |
| JP | 2001-134584 A | 5/2001 |
| JP | 2012-123230 A | 6/2012 |

OTHER PUBLICATIONS

Jyh-Shing Roger Jang et al., "Hierarchical Filtering Method for Content-based Music Retrieval via Acoustic Input", 9th ACM International Conference on Multimedia, 2001, pp. 401-410 (10 pages total).
English Translation of the Written Opinion of the International Searching Authority dated Aug. 26, 2020 in International Application No. PCT/CN2020/091698.
Notice of Reasons for Refusal dated Jun. 13, 2022 from the Japanese Patent Office in Japanese Application No. 2021-535923.
International Search Report of PCT/CN2020/091698 dated Aug. 26, 2020 [PCT/ISA/210].
Written Opinion of PCT/CN2020/091698 dated Aug. 26, 2020 [PCT/ISA/237].
Notice of Reasons for Refusal dated Jan. 16, 2023 from the Japanese Patent Office in Japanese Application No. 2021-535923.

* cited by examiner

METHOD AND APPARATUS FOR MATCHING AUDIO CLIPS, COMPUTER-READABLE MEDIUM, AND ELECTRONIC DEVICE

CROSS-REFERENCE TO RELATED APPLICATION(S)

This application is a bypass continuation application of International Application No. PCT/CN2020/091698, filed on May 22, 2020, which claims priority to Chinese Patent Application No. 201910441366.5, entitled "METHOD AND APPARATUS FOR MATCHING AUDIO CLIPS, COMPUTER-READABLE MEDIUM, AND ELECTRONIC DEVICE" and filed on May 24, 2019 with the China National Intellectual Property Administration, the disclosures of which are herein incorporated by reference in their entireties.

FIELD

The disclosure relates to the field of computer and communication technologies, and in particular, to a method and an apparatus for matching audio clips, a computer-readable medium, and an electronic device.

BACKGROUND

In a scenario of matching audio clips, for example, query by humming or scoring by humming, an audio feature sequence of a hummed tune and a feature sequence of an audio may be compared to obtain a degree of difference to measure a similarity between two audio clips. However, there is a need to improve the accuracy of matching audio.

SUMMARY

One or more example embodiments of the disclosure provide a method and an apparatus for matching audio clips, a computer-readable medium, and an electronic device, to improve the accuracy of matching audio clips.

Other features and advantages of the disclosure become obvious through the following detailed descriptions, or may be learned through the practice of the disclosure.

According to an aspect of the embodiments of the disclosure, a method for matching audio clips is provided, the method including:

obtaining a first feature sequence corresponding to a first audio clip and a second feature sequence corresponding to a second audio clip;

constructing a distance matrix between the first feature sequence and the second feature sequence, elements in the distance matrix representing respective distances between first positions in the first feature sequence and second positions in the second feature sequence;

determining a first accumulation distance between a start position and a target position in the distance matrix and a second accumulation distance between an end position and the target position in the distance matrix;

determining a minimum distance between the first feature sequence and the second feature sequence based on the first accumulation distance and the second accumulation distance; and determining a degree of matching between the first audio clip and the second audio clip according to the minimum distance.

According to another aspect of the embodiments of the disclosure, a method for matching audio clips is provided, the method including:

obtaining, by a server, a first feature sequence corresponding to a first audio clip and a second feature sequence corresponding to a second audio clip;

constructing, by the server, a distance matrix between the first feature sequence and the second feature sequence, elements in the distance matrix representing respective distances between first positions in the first feature sequence and second positions in the second feature sequence;

determining, by the server, a first accumulation distance between a start position and a target position in the distance matrix and a second accumulation distance between an end position and the target position in the distance matrix;

determining, by the server, a minimum distance between the first feature sequence and the second feature sequence based on the first accumulation distance and the second accumulation distance; and determining, by the server, a degree of matching between the first audio clip and the second audio clip according to the minimum distance.

According to an aspect of the embodiments of the disclosure, an apparatus for matching audio clips is provided, the apparatus including:

at least one memory configured to store program code; and at least one processor configured to read the program code and operate as instructed by the program code, the program code comprising:

obtaining code configured to cause the at least one processor to obtain a first feature sequence corresponding to a first audio clip and a second feature sequence corresponding to a second audio clip;

construction code configured to cause the at least one processor to: obtain the first feature sequence and the second feature sequence from the obtaining unit, and construct a distance matrix between the first feature sequence and the second feature sequence, elements in the distance matrix representing respective distances between first positions in the first feature sequence and second positions in the second feature sequence; and processing code configured to cause the at least one processor to: obtain the distance matrix from the construction unit, and determine a first accumulation distance between a start position and a target position in the distance matrix and a second accumulation distance between an end position and the target position in the distance matrix; determine a minimum distance between the first feature sequence and the second feature sequence based on the first accumulation distance and the second accumulation distance; and determine a degree of matching between the first audio clip and the second audio clip according to the minimum distance.

In an example embodiment, the processing code further includes:

first determining code configured to cause the at least one processor to determine accumulation distances between the start position and first candidate positions, the first candidate positions being located between the start position and the target position in the distance matrix;

second determining code configured to cause the at least one processor to determine first candidate accumulation distances between the start position and the target position, each of the first candidate accumulation distances being based on an accumulation distance between the start position and a corresponding first candidate position and a distance value represented by the corresponding first candidate position in the distance matrix; and third determining code configured to cause the at least one processor to determine, as the first accumulation distance, a minimum value among the first candidate accumulation distances.

In an example embodiment, the second determining code is further configured to cause the at least one processor to, with respect to each of the first candidate positions:

add the accumulation distance between the start position and the corresponding first candidate position and the distance value represented by the corresponding first candidate position, to obtain a distance sum value of the corresponding first candidate position, the accumulation distance of the corresponding first candidate position being based on distances between the start position and previous positions of the corresponding first candidate position, the previous positions being located between the start position and the corresponding first candidate position in the distance matrix; and determine the distance sum value as a first candidate accumulation distance of the corresponding first candidate position.

In an example embodiment, the second determining code is further configured to cause the at least one processor to, with respect to each of the first candidate positions:

perform a weighted calculation on the distance value represented by the corresponding first candidate position and a weight value of the corresponding first candidate position, to obtain a weighted distance value of the corresponding first candidate position;

add the accumulation distance between the start position and the corresponding first candidate position and the weighted distance value of the corresponding first candidate position to obtain a distance sum value of the corresponding first candidate position, the accumulation distance of the corresponding first candidate position being based on distances between the start position and previous positions of the corresponding first candidate position, the previous positions being located between the start position and the corresponding first candidate position in the distance matrix; and determine the distance sum value as a first candidate accumulation distance of the corresponding first candidate position.

In an example embodiment, wherein the second determining code is further configured to cause the at least one processor to, prior to the determining the distance sum value as the first candidate accumulation distance of the corresponding first candidate position:

determine a distance between the corresponding first candidate position and a diagonal of the distance matrix, the diagonal being a straight line connecting the start position and the end position; and determine the weight value of the corresponding first candidate position according to the distance between the corresponding first candidate position and the diagonal.

In an example embodiment, the first candidate positions are located within a preset distance range around the target position.

In an example embodiment, the processing code further includes:

fourth determining code configured to cause the at least one processor to determine accumulation distances between the end position and second candidate positions, the second candidate positions being located between the target position and the end position in the distance matrix;

fifth determining code configured to cause the at least one processor to determine second candidate accumulation distances between the end position and the target position, each of the first candidate accumulation distances being based on an accumulation distance between the end position and a corresponding second candidate position and a distance value represented by the corresponding second candidate position in the distance matrix; and sixth determining code configured to cause the at least one processor to determine, as the second accumulation distance, a minimum value among the second candidate accumulation distances.

In an example embodiment, the second candidate positions are located within a preset distance range around the target position.

In an example embodiment, the processing code further includes:

seventh determining code configured to cause the at least one processor to determine the minimum distance by adding a distance value represented by the target position in the distance matrix, the first accumulation distance, and the second accumulation distance.

In an example embodiment, the processing code further includes:

eighth determining code configured to cause the at least one processor to determine the minimum distance by adding a weighted distance value represented by the target position in the distance matrix, the first accumulation distance, and the second accumulation distance.

In an example embodiment, the first audio clip corresponds to n first feature sequences, and the second audio clip corresponds to n second feature sequences, n being a positive integer;

the obtaining code is further configured to cause the at least one processor to obtain n minimum distances between the n first feature sequences and the n second feature sequences; and the processing code is further configured to cause the at least one processor to: perform a weighted summation on the n minimum distances to obtain a weighted distance value between the first audio clip and the second audio clip; and determine the degree of matching between the first audio clip and the second audio clip according to the weighted distance value.

In an example embodiment, based on the foregoing solution, the features of an audio clip include a pitch feature, a musical tone energy, a Mel-frequency cepstrum coefficient, and a root mean square energy value of each frame.

According to another aspect of the embodiments of the disclosure, a non-transitory computer-readable medium is provided, storing a computer program, the computer program, when executed by a processor, implementing the method for matching audio clips according to the foregoing embodiments.

According to another aspect of the embodiments of the disclosure, an electronic device is provided, including: one or more processors; and a storage apparatus, configured to store one or more programs, the one or more programs, when executed by the one or more processors, causing the one or more processors to implement the method for matching audio clips according to the foregoing embodiments.

According to another aspect of the embodiments of the disclosure, a computer program product is provided, the computer program product, when running on a computer, causing the computer to perform the method for matching audio clips according to the embodiments of the disclosure.

BRIEF DESCRIPTION OF THE DRAWINGS

To describe the technical solutions of example embodiments of the disclosure more clearly, the following briefly introduces the accompanying drawings for describing the example embodiments. The accompanying drawings in the following description show only some embodiments of the disclosure, and a person of ordinary skill in the art may still derive other drawings from these accompanying drawings without creative efforts.

DETAILED DESCRIPTION

To make the objectives, technical solutions, and advantages of the disclosure clearer, the following further describes implementations of the disclosure in detail with reference to the accompanying drawings.

Figure 1:
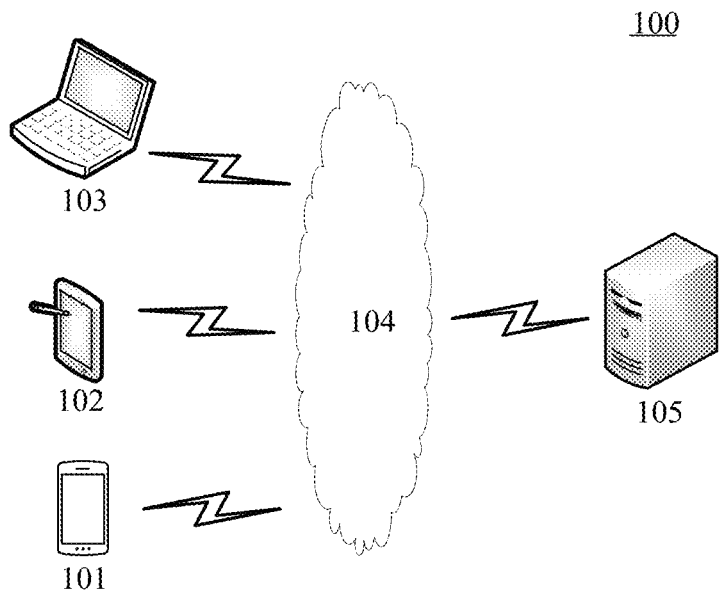
FIG. 1 is a schematic diagram of a system architecture according to an example embodiment of the disclosure.

FIG. 1 is a schematic diagram of an example system architecture to which a technical solution according to an embodiment of the disclosure is applicable.

As shown in FIG. 1, the system architecture may include a terminal device (which may be, for example but not limited to, any one or more of a smart phone 101, a tablet computer 102, and a portable computer 103 shown in FIG. 1, or any other type such as a desktop computer, and the like), a network 104, and a server 105. The network 104 is configured to provide a medium of a communication link between the terminal device and the server 105. The network 104 may include various connection types, for example, a wired communication link, and a wireless communication link.

It is to be understood that the quantities of terminal devices, networks, and servers in FIG. 1 are only schematic. There may be any quantities of terminal devices, networks, and servers as required. For example, the server 105 may be a server cluster including a plurality of servers.

In an embodiment of the disclosure, a user may upload a first audio clip (for example, corresponding to a sound produced or sung by the user) to the server 105 by using a terminal device. After obtaining the first audio clip uploaded by the terminal device, the server 105 may extract a first feature sequence corresponding to the first audio clip, obtain a second audio clip (for example, an audio clip pre-stored in the server 105) that needs to be matched against the first audio clip, and extract a second feature sequence corresponding to the second audio clip. The server 105 then constructs a distance matrix between the first feature sequence and the second feature sequence, each element in the distance matrix being used for representing a distance between a corresponding one of first positions and a corresponding one of second positions, the first positions being in the first feature sequence, the second positions being in the second feature sequence.

In an embodiment of the disclosure, after a distance matrix is constructed, the server 105 may calculate a first accumulation distance between a start position in the distance matrix and a target position in the distance matrix and a second accumulation distance between an end position and the target position in the distance matrix, then calculate a minimum distance between the first feature sequence and the second feature sequence based on the first accumulation distance and the second accumulation distance, and determine a degree of matching between the first audio clip and the second audio clip according to the minimum distance. Therefore, in the technical solution of the embodiments of the disclosure, a minimum distance between feature sequences of audio clips may be comprehensively calculated in two directions (that is, a direction from a start position to a target position in a distance matrix and a direction from an end position to the target position in the distance matrix), so that matching relationships between the feature sequences in the two directions are both taken into account, and it may be ensured that the calculated minimum distance between the two feature sequences is more accurate, which improves the accuracy of matching audio clips. The degree of matching between audio clips may be determined as high according to a small minimum distance between feature sequences of the audio clips and determined as low according to a high minimum distance. Based on a high degree of matching (that is, based on a determination that the audio clips match each other), a preset operation may be performed such as, for example but not limited to, query by humming or scoring by humming.

Example embodiments of the technical solutions in the embodiments of the disclosure are described below in detail.

Figure 2:
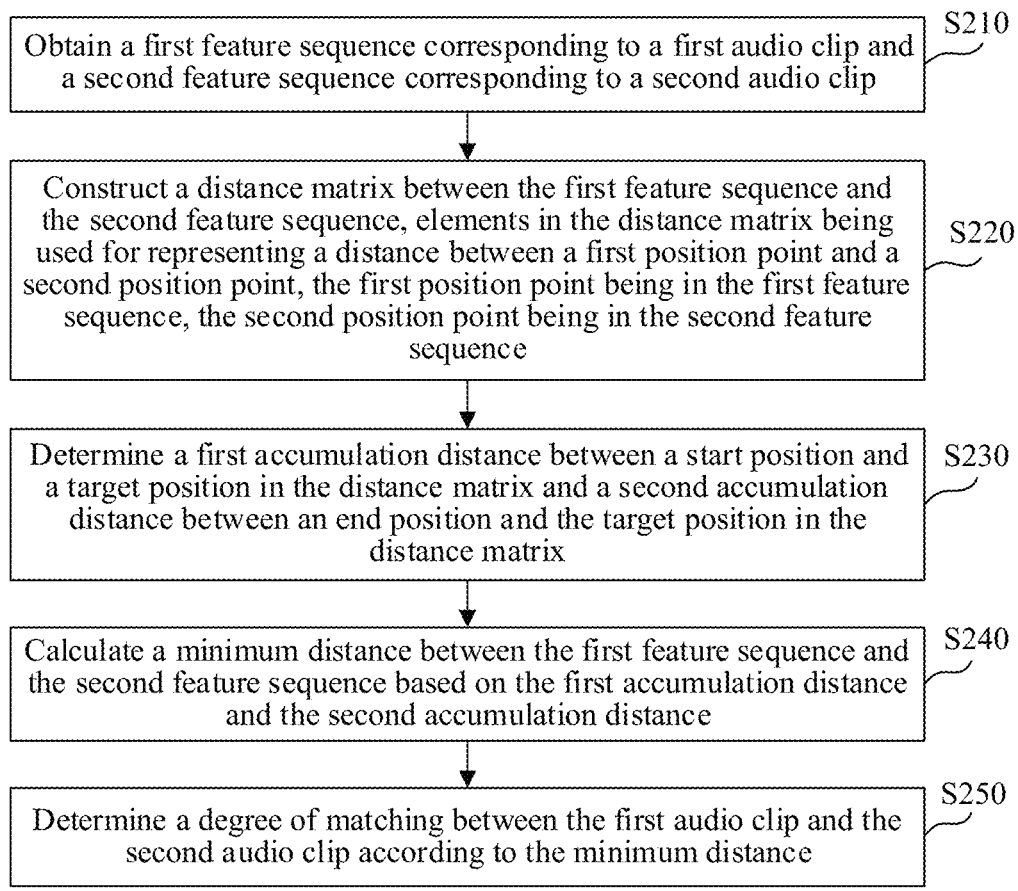
FIG. 2 is a flowchart of a method for matching audio clips according to an example embodiment of the disclosure.

FIG. 2 is a flowchart of a method for matching audio clips according to an example embodiment of the disclosure. The method for matching audio clips may be performed by a device having a computing processing function, for example, the server 105 shown in FIG. 1. As shown in FIG. 2, the method for matching audio clips at least includes the following operations:

Operation S210: A server obtains a first feature sequence corresponding to a first audio clip and a second feature sequence corresponding to a second audio clip.

In an embodiment of the disclosure, the first audio clip and the second audio clip are two audio clips that need to be compared with each other to determine a degree of matching. For example, the first audio clip is an audio clip inputted by the user (such as an audio clip created by the user, an audio clip recorded by the user), and the second audio clip is an audio clip stored in a database.

In an embodiment of the disclosure, the first feature sequence and the second feature sequence are obtained for the same type of an audio feature, and the audio feature includes at least one of a pitch feature, a musical tone energy, a Mel-frequency cepstrum coefficient, and a root mean square energy value of each frame.

In an embodiment of the disclosure, the feature sequences of the first audio clip and the second audio clip are extracted by using at least one of an autocorrelation function algorithm, a Yin algorithm, and a PYin algorithm.

Operation S220: The server constructs a distance matrix between the first feature sequence and the second feature sequence, each element in the distance matrix being used for representing a distance between a corresponding one of first positions and a corresponding one of second positions, the first positions being in the first feature sequence, the second positions being in the second feature sequence.

Figure 3:
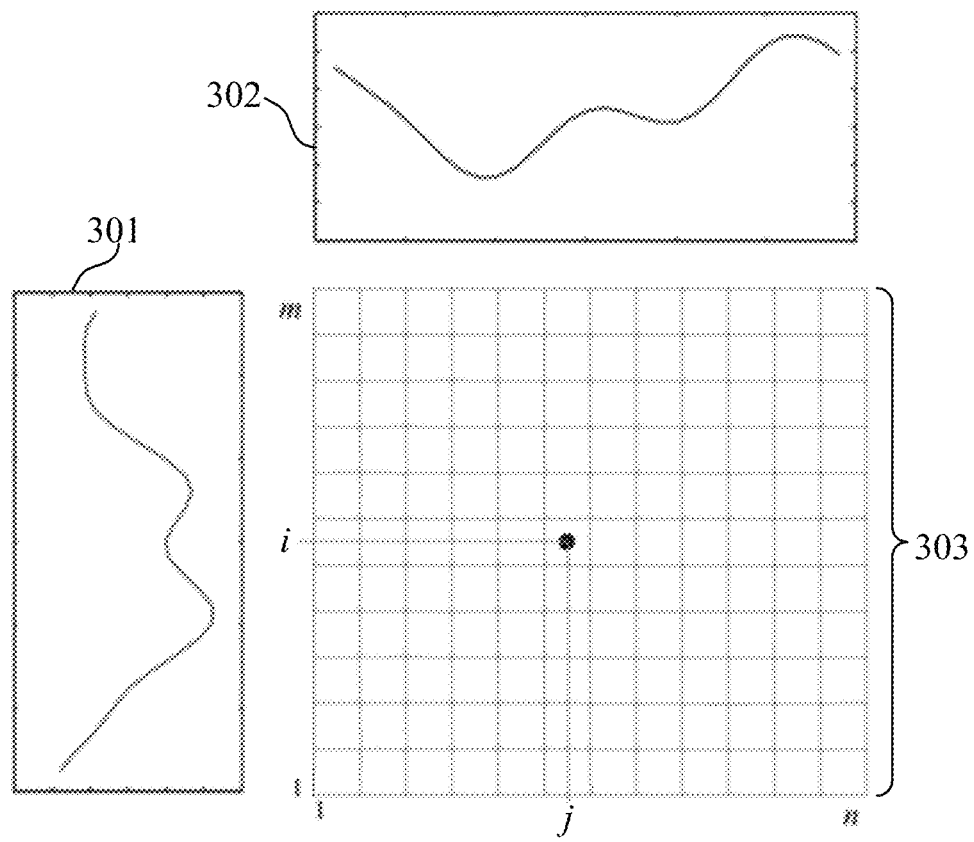
FIG. 3 is a schematic diagram of a distance matrix according to an example embodiment of the disclosure.

In some embodiments, the size of the distance matrix is related to lengths of the first feature sequence and the second feature sequence. For example, when the length of the first feature sequence is m and the length of the second feature sequence is n, the size of the distance matrix is m×n. For example, as shown in FIG. 3, assuming that the first feature sequence is 301 and the second feature sequence is 302, and a distance matrix 303 with the size of m×n is constructed. Each position in the distance matrix represents a distance between a point on the first feature sequence 301 and a point on the second feature sequence 302. For example, (i,j) in the distance matrix represents a distance between an $i^{th}$ point on the first feature sequence 301 and a $j^{th}$ point on the second feature sequence 302, and the distance includes an Euclidean distance.

Operation S230: The server determines a first accumulation distance between a start position and a target position in the distance matrix and a second accumulation distance between an end position and the target position in the distance matrix.

In an embodiment of the disclosure, the start position in the distance matrix is a position corresponding to the first feature point on the first feature sequence and the first feature point on the second feature sequence in the distance matrix; the end position in the distance matrix is a position corresponding to the last feature point on the first feature sequence and the last feature point on the second feature sequence in the distance matrix; and the target position includes any position other than the start position and the end position in the distance matrix.

Figure 4:
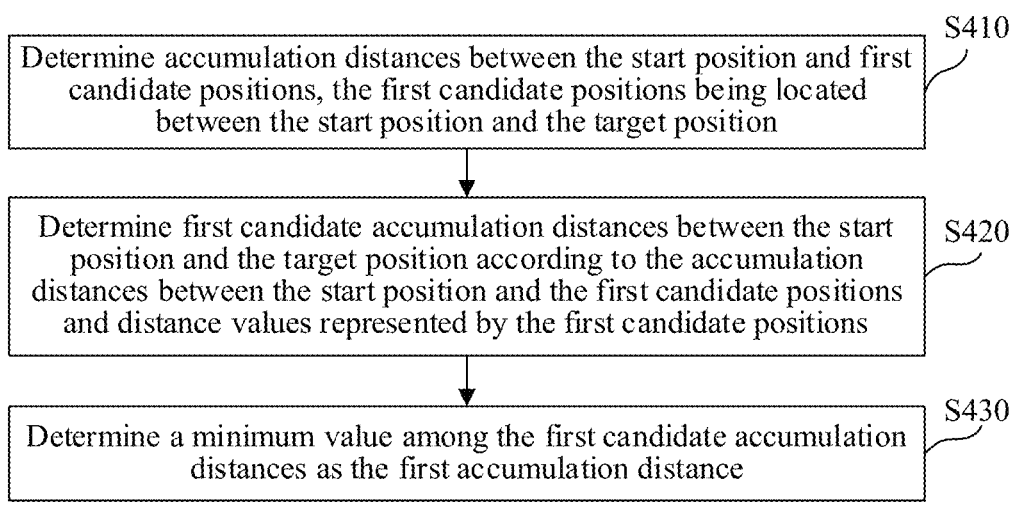
FIG. 4 is a flowchart of calculating a first accumulation distance according to an example embodiment of the disclosure.

In an embodiment of the disclosure, as shown in FIG. 4, a calculation process of the first accumulation distance between the start position and the target position includes the following operations S410 to S430:

Operation S410: The server determines accumulation distances between the start position and first candidate positions, the first candidate positions being located between the start position and the target position in the distance matrix.

Figure 5:
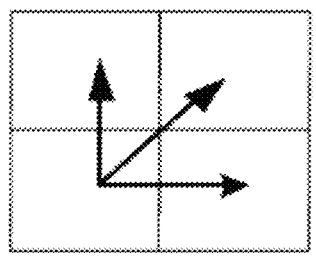
FIG. 5 is a schematic diagram of calculation directions of calculating accumulation distances from a start position in a distance matrix according to an example embodiment of the disclosure.

In an embodiment of the disclosure, when the accumulation distances are calculated from the start position in the distance matrix, the accumulation distances may be calculated one by one in three directions on the matrix, that are, in a direction toward the top (or upward direction), in a direction to the right, and a direction toward the upper right corner as shown in FIG. 5.

That is, associations exist between the first candidate positions and the target position, the associations being used for indicating that the first candidate positions are located within a preset distance range around the target position. For example, if coordinates of the target position are (i,j), coordinates of a plurality of first candidate positions include: (i−1, j−1), (i−1, j−x), and (i−x, j−1), where x is a natural number less than i or j. For example, x is 1, 2, 3, or the like.

In an embodiment of the disclosure, in the foregoing embodiment, the value of may be greater than 1. In this case, the accumulation is performed at intervals of (x−1) positions when the accumulation distances are calculated, thereby accelerating the calculation process of the accumulation distances, which increases the calculation rate. However, to ensure the accuracy of calculation results, the value of x may be set not to be excessively large, and may be set to an appropriate value depending on an embodiment. For example, the value of may be set to 2.

In an embodiment of the disclosure, the process of calculating the accumulation distances between the start position and the first candidate positions may be similar to the process of calculating the accumulation distances between the start position and the target position.

Operation S420: The server determines first candidate accumulation distances between the start position and the target position according to the accumulation distances between the start position and the first candidate positions and distance values represented by values of the first candidate positions in the distance matrix.

In an embodiment of the disclosure, the process of calculating a plurality of first candidate accumulation distances between the start position and the target position includes: adding the accumulation distances between the start position and the first candidate positions and the distance values represented by the first candidate positions to obtain distance sum values corresponding to the first candidate positions, and determining the distance sum values as the first candidate accumulation distances corresponding to the first candidate positions. For example, for each of the first candidate positions, a first candidate accumulation distance may be obtained by adding an accumulation distance between the start position and a corresponding first candidate position and the distance value represented by the corresponding first candidate position in the distance matrix, to obtain a distance sum value of the corresponding first candidate position. The accumulation distance of the corresponding first candidate position is based on distances between the start position and previous positions of the corresponding first candidate position, the previous positions being located between the start position and the corresponding first candidate positions in the distance matrix. Examples of obtaining the accumulation distance by using Formula 2 or Formula 3 are described below.

For example, if a first candidate position is (i−1, j−1) and a distance value represented by the first candidate position in the distance matrix is d(i−1,j−1), a distance sum value corresponding to the first candidate position may be expressed as D_forward(i−1, j−1)+d(i−1, j−1), where D_forward(i−1, j−1) represents an accumulation distance between the start position and the first candidate position in the distance matrix.

In an embodiment of the disclosure, to calculate the first candidate accumulation distances between the start position and the target position, a weighted calculation is first performed on the distance values represented by the first candidate positions according to the distance values represented by the first candidate positions and weight values corresponding to the first candidate positions, to obtain weighted distance values corresponding to the first candidate positions; and the accumulation distances between the start position and the first candidate positions and the weighted distance values corresponding to the first candidate positions are added to obtain distance sum values corresponding to the first candidate positions, and the distance sum values are determined as the first candidate accumulation distances corresponding to the first candidate positions. For example, if a first candidate position is (i−1, j−1), a distance value represented by the first candidate position is d(i−1, j−1), and a weight value corresponding to the first candidate position is w, a distance sum value corresponding to the first candidate position may be expressed as D_forward(i−1, j−1)+d(i−1, j−1)×w, where D_forward(i−1, j−1) represents an accumulation distance between the start position and the first candidate position in the distance matrix.

In some embodiments, the weight value corresponding to the foregoing first candidate position is determined according to a distance between the first candidate position and a diagonal of the distance matrix. That is, distances between the first candidate positions and a diagonal of the distance matrix are determined, and the weight values corresponding to the first candidate positions are determined according to the distances between the first candidate positions and the diagonal. The diagonal is a straight line connecting the start position and the end position of the distance matrix. That is, in the foregoing embodiments, since distances between the first candidate positions and the diagonal of the distance matrix may be different, the weight values corresponding to the first candidate positions are considered. To avoid positions selected from the first candidate positions from deviating too far from the diagonal of the distance matrix, the weight values corresponding to the first candidate positions are set according to the distances between the first candidate positions and the diagonal of the distance matrix. For example, if a position is closer to the diagonal, a weight corresponding to the position is smaller (e.g., closer to 1); and if a position is farther from the diagonal, a weight corresponding to the position is larger.

Operation S430: The server determines a minimum value among the first candidate accumulation distances as the first accumulation distance.

Based on the technical solution of an example embodiment shown in FIG. 4, the first accumulation distance between the start position in the distance matrix and the target position in the distance matrix may be obtained. However, the disclosure is not limited thereto.

The calculating a second accumulation distance between an end position and the target position in the distance matrix in an embodiment of the disclosure is described below in with reference to FIG. 6, and may include the following operations S610 to S630:

Operation S610: The server determines accumulation distances between the end position and second candidate positions, the second candidate positions being located between the target position and the end position.

Figure 7:
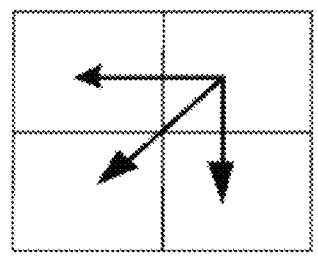
FIG. 7 is a schematic diagram of calculation directions of calculating accumulation distances from an end position in a distance matrix according to an example embodiment of the disclosure.

In an embodiment of the disclosure, when the accumulation distances may be calculated from the end position in the distance matrix, the accumulation distances are calculated one by one in three directions on the matrix, that are, in a direction toward the bottom, in a direction toward the left, and in a direction toward the lower left corner as shown in FIG. 7. That is, associations exist between the second candidate positions and the target position, the associations being used for indicating that the second candidate positions are located within a preset range around the target position. For example, if coordinates of the target position are (i,j), coordinates of a plurality of second candidate positions include: (i+1, j+1), (i+1, j+y), and (i+y, j+1), where y is a natural number. For example, y is 1, 2, 3, or the like.

In an embodiment of the disclosure, in the foregoing embodiment, the value of y may be greater than 1. In this case, the accumulation is performed at intervals of (y−1) positions when the accumulation distances are calculated, thereby accelerating the calculation process of the accumulation distances, which increases the calculation rate. However, to ensure the accuracy of calculation results, the value of y may be set not to be excessively large, and may be set to an appropriate value depending on an embodiment, for example, set to 2.

In an embodiment of the disclosure, the process of calculating the accumulation distances between the end position and the second candidate positions may be similar to the process of calculating the accumulation distances between the end position and the target position.

In operation S620, the server determines second candidate accumulation distances between the end position and the target position according to the accumulation distances between the end position and the second candidate positions and distance values represented by values of the second candidate positions in the distance matrix.

In an embodiment of the disclosure, the process of calculating the second candidate accumulation distances between the end position and the target position includes: adding the accumulation distances between the end position and the second candidate positions and the distance values represented by the second candidate positions to obtain distance sum values corresponding to the second candidate positions, and determining the distance sum values as the second candidate accumulation distances corresponding to the second candidate positions. For example, for each of the second candidate positions, a second candidate accumulation distance may be obtained by adding an accumulation distance between the end position and a corresponding second candidate position and the distance value represented by the corresponding second candidate position to obtain a distance sum value of the corresponding second candidate position.

For example, if a second candidate position is (i+1, j+1) and a distance value represented by the second candidate position in the distance matrix is d(i+1, j+1), a distance sum value corresponding to the second candidate position may be expressed as D_backward(i+1, j+1)+d(i+1, j+1), where D_backward(i+1, j+1) represents an accumulation distance between the end position and the second candidate position in the distance matrix.

In an embodiment of the disclosure, the process of calculating the second candidate accumulation distances between the end position and the target position includes:

performing a weighted calculation on the distance values represented by the second candidate positions according to the distance values represented by the second candidate positions and weight values corresponding to the second candidate positions, to obtain weighted distance values corresponding to the second candidate positions; and adding the accumulation distances between the end position and the second candidate positions and the weighted distance values corresponding to the second candidate positions to obtain distance sum values corresponding to the second candidate positions, and determining the distance sum values as the second candidate accumulation distances corresponding to the second candidate positions. For example, if a second candidate position is (i+1, j+1), a distance value represented by the second candidate position is d(i+1, j+1), and a weight value corresponding to the second candidate position is w, a distance sum value corresponding to the second candidate position may be expressed as D_backward(i+1, j+1)+d(i+1, j+1)×w, where D_backward(i+1, j+1) represents an accumulation distance between the end position and the second candidate position in the distance matrix.

In some embodiments, the weight value corresponding to the foregoing second candidate position is determined according to a distance between the second candidate position and a diagonal of the distance matrix. That is, distances between the second candidate positions and the diagonal of the distance matrix are determined, and the weight values corresponding to the second candidate positions are determined according to the distances between the second candidate positions and the diagonal. The diagonal is a straight line connecting the start position and the end position of the distance matrix. That is, in the foregoing embodiments, since distances between the second candidate positions and the diagonal of the distance matrix may be different, the weight values corresponding to the second candidate positions are considered. To avoid positions selected from the second candidate positions from deviating too far from the diagonal of the distance matrix, the weight values corresponding to the second candidate positions are set according to the distances between the second candidate positions and the diagonal of the distance matrix. For example, if a position is closer to the diagonal, a weight corresponding to the position is smaller (e.g., closer to 1); and if a position is farther from the diagonal, a weight corresponding to the position is larger.

Operation S630: The server determines a minimum value among the second candidate accumulation distances as the second accumulation distance.

Figure 6:
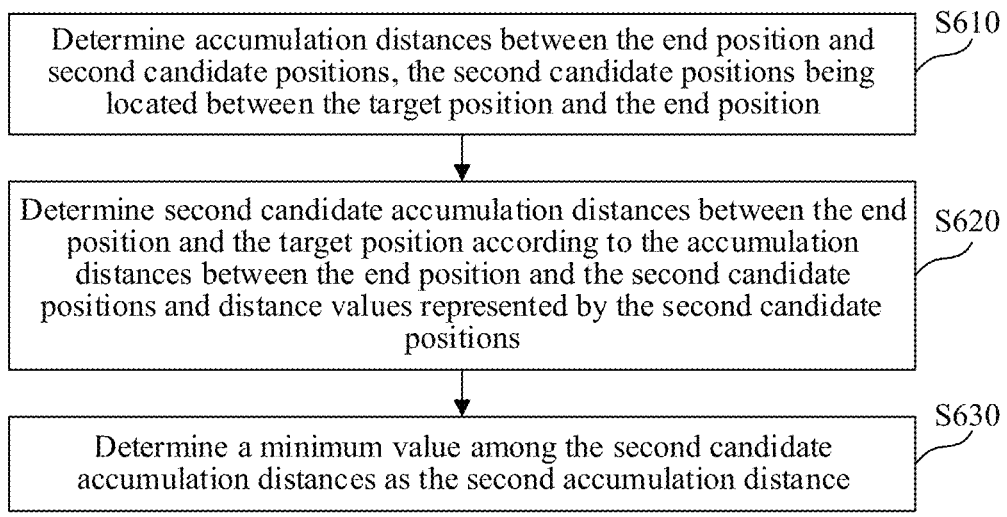
FIG. 6 is a flowchart of calculating a second accumulation distance according to an example embodiment of the disclosure.

Based on the technical solution of an example embodiment shown in FIG. 6, the second accumulation distance between the end position in the distance matrix and the target position in the distance matrix may be obtained. However, the disclosure is not limited thereto.

Referring back to FIG. 2, operation S240 is performed as follows. The server calculates a minimum distance between the first feature sequence and the second feature sequence based on the first accumulation distance and the second accumulation distance.

Figure 8:
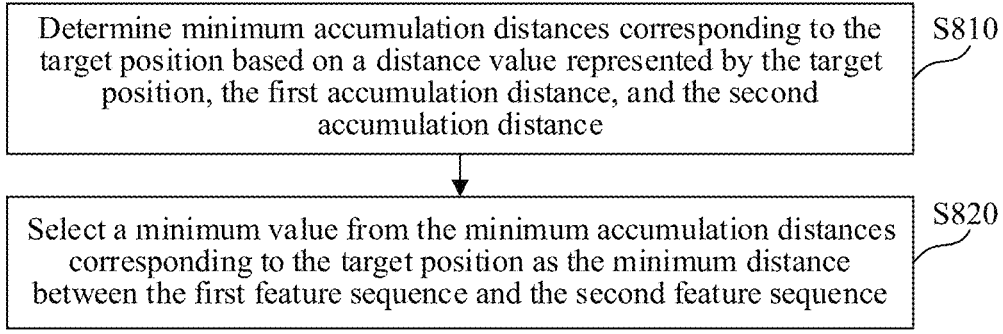
FIG. 8 is a flowchart of calculating a minimum distance between a first feature sequence and a second feature sequence according to an example embodiment of the disclosure.

In an embodiment of the disclosure, as shown in FIG. 8, the process of calculating a minimum distance between the first feature sequence and the second feature sequence based on the first accumulation distance and the second accumulation distance in operation S240 includes the following operations S810 and S820:

Operation S810: The server determines minimum accumulation distances corresponding to the target position based on a distance value represented by a value of the target position in the distance matrix, the first accumulation distance, and the second accumulation distance.

In an embodiment of the disclosure, the distance value represented by the target position, the first accumulation distance, and the second accumulation distance are added to obtain the minimum accumulation distances corresponding to the target position. For example, if a target position is (i,j), a distance value represented by the target position in the distance matrix is d(i,j), a first accumulation distance is D_forward(i,j), and a second accumulation distance is D_backward(i,j), the minimum accumulation distance corresponding to the target position is D_total(i,j)=D_forward(i,j)+D_backward(i,j)+d(i,j).

In an embodiment of the disclosure, a weighted calculation is performed on the distance value represented by the target position and a weight value corresponding to the target position to obtain a weighted distance value corresponding to the target position. The weighted distance value corresponding to the target position, the first accumulation distance, and the second accumulation distance are then added to obtain the minimum accumulation distances corresponding to the target position. For example, if a target position is (i,j), a distance value represented by the target position is d(i,j), a weight value corresponding to the target position is w, a first accumulation distance is D_forward(i,j), and a second accumulation distance is D_backward(i,j), the minimum accumulation distance corresponding to the target position is D_total(i,j)=D_forward(i,j)+D_backward(i,j)+d(i,j)×w. The weight value corresponding to the target position may be determined according to the distance between the target position and the diagonal of the distance matrix.

Referring to FIG. 8, in operation S820, the server selects a minimum value from the minimum accumulation distances corresponding to the target position as the minimum distance between the first feature sequence and the second feature sequence. For example, the server selects a minimum value from the minimum accumulation distance, obtained by adding the distance value represented by the target position, the first accumulation distance, and the second accumulation distance, and the minimum accumulation distance, obtained by adding a weighted distance value corresponding to the target position, the first accumulation distance, and the second accumulation distance.

In an alternative embodiment, the minimum distance may be determined by adding the distance value represented by the target position, the first accumulation distance, and the second accumulation distance, or the minimum distance may be determined by adding a weighted distance value corresponding to the target position, the first accumulation distance, and the second accumulation distance.

In an embodiment of the disclosure, the minimum distance between the first feature sequence and the second feature sequence is $$\min_{i,j}\{D\_total(i, j)\}.$$

Referring back to FIG. 2, operation S240 is performed as follows. The server determines a degree of matching between the first audio clip and the second audio clip according to the minimum distance.

Figure 9:
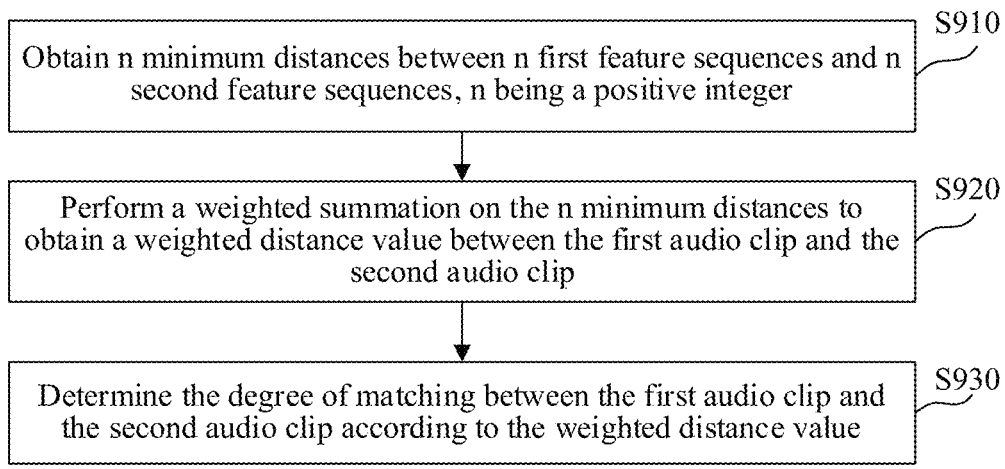
FIG. 9 is a flowchart of determining a degree of matching between a first audio clip and a second audio clip according to an example embodiment of the disclosure.

In an embodiment of the disclosure, as shown in FIG. 9, the process of determining a degree of matching between the first audio clip and the second audio clip according to the minimum distance between the first feature sequence and the second feature sequence in operation S240 includes the following operations S910 to S930:

Operation S910: The server obtains n minimum distances between n first feature sequences and n second feature sequences, n being a positive integer.

In some embodiments, the first audio clip corresponds to n first feature sequences, and the second audio clip corresponds to n second feature sequences, where an $i^{th}$ first feature sequence and an $i^{th}$ second feature sequence correspond to the same type of the feature, and when the minimum distances are calculated, a minimum distance between the $i^{th}$ first feature sequence and the $i^{th}$ second feature sequence is calculated, i being a positive integer, and i≤n. The feature of the audio clip includes at least one of a pitch feature, a musical tone energy, a Mel-frequency cepstrum coefficient, and a root mean square energy value of each frame. That is, for each feature, the first feature sequence of the first audio clip and the second feature sequence of the second audio clip are respectively obtained, and the minimum distance between the two feature sequences is calculated accordingly. In this manner, the minimum distances between the first feature sequence and the second feature sequence respectively corresponding to various features are obtained.

Operation S920: The server performs a weighted summation on the n minimum distances to obtain a weighted distance value between the first audio clip and the second audio clip.

In an embodiment of the disclosure, the weight corresponding to the feature may be set according to the importance of the feature. For example, if a feature is important, the weight corresponding to the feature is set to a large value; and if a feature is not very important, the weight corresponding to the feature is set to a small value to highlight the impact of important features on the weighted distance value, and weaken the impact of non-important features on the weighted distance value.

Operation S930: The server determines the degree of matching between the first audio clip and the second audio clip according to the weighted distance value.

In an embodiment of the disclosure, after the weighted distance value between the first audio clip and the second audio clip is calculated, the weighted distance value may be divided by a reference value (such as the length of the first feature sequence or the length of the second feature sequence) to obtain a matching score, and the degree of matching between the first audio clip and the second audio clip is then determined according to the matching score. For example, if the matching score is high, it is determined that the degree of matching between the first audio clip and the second audio clip is strong; and if the matching score is low, it is determined that the degree of matching between the first audio clip and the second audio clip is weak.

In an embodiment of the disclosure, the minimum distance between the first feature sequence and the second feature sequence corresponding to a feature may be directly used as the distance between the first audio clip and the second audio clip to determine the degree of matching between the first audio clip and the second audio clip.

In the technical solution of the embodiments of the disclosure, a minimum distance between feature sequences of audio clips is comprehensively calculated in two directions (that is, a direction from a start position to a target position in a distance matrix and a direction from an end position to the target position in the distance matrix), so that matching relationships between the feature sequences in the two directions are both taken into account, and it may be ensured that the calculated minimum distance between the two feature sequences is more accurate, which improves the accuracy of matching audio clips.

Hereinafter, by using an example of a humming made by a user, the technical solutions of the embodiments of the disclosure are described in detail.

Figure 10:
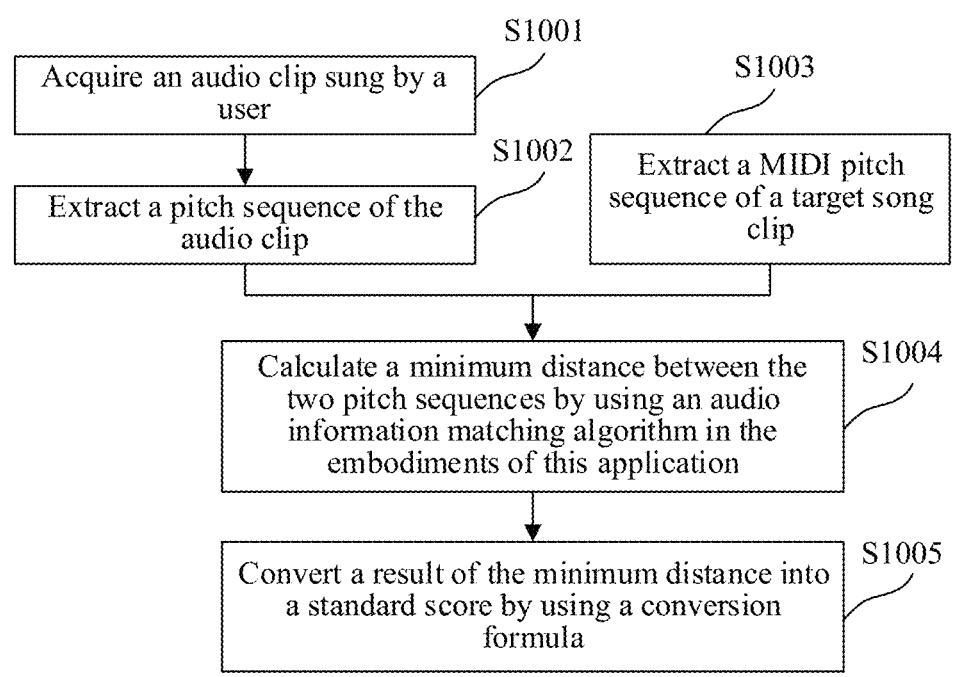
FIG. 10 is a flowchart of a method of scoring by humming according to an example embodiment of the disclosure.

As shown in FIG. 10, a method of scoring by humming according to an embodiment of the disclosure includes the following operations:

Operation S1001: A server acquires an audio clip corresponding to a sound created by a user.

In an embodiment of the disclosure, the user sings or hums a part of a specific song, and the terminal acquires an audio clip of the user based thereon, and records the start and end time points of the audio clip to obtain an audio duration. For example, if the audio duration of the audio clip acquired by the terminal is less than a preset duration, the audio clip is filtered out, and information about a scoring failure is returned.

Operation S1002: The server extracts a pitch sequence of the audio clip.

In an embodiment of the disclosure, an autocorrelation function method, a Yin algorithm or a PYin algorithm may be used to extract the pitch sequence of the audio clip according to a specified sampling rate.

Operation S1003: The server extracts a musical instrument digital interface (MIDI) pitch sequence of a target song clip.

In an embodiment of the disclosure, a bottom layer of the humming scoring depends on a MIDI library, which is the source of scoring criteria. The audio clip corresponding to a sound created by the user has a start timestamp and an end timestamp correspondingly, which may accurately correspond to a note sequence in the MIDI library, and the pitch sequence is then obtained according to a conversion formula of MIDI notes and pitches. For example, the MIDI pitch sequence of the target song clip is generated in the MIDI library in advance.

Operation S1003, operation S1001, and operation S1002 are not arranged in a rigid order.

Operation S1004: The server calculates a minimum distance between the two pitch sequences by using an audio information matching algorithm in the embodiments of the disclosure.

Operation S1005: The server converts a result of the minimum distance into a standard score by using a conversion formula.

In an embodiment of the disclosure, since the minimum distance in operation S1004 is obtained by accumulation, when the pitch sequence is longer, the value of the calculated minimum distance is larger. To eliminate this impact, the minimum distance calculated in operation S1004 may be divided by the pitch sequence length of the audio clip of the user to obtain a standard score, and the standard score is then fed back to the user.

In operation S1004, it is assumed that two pitch sequences are a sequence p and a sequence q respectively, where the length of the sequence p is m and the length of the sequence q is n, that is, $p=(p_1, p_2, \ldots, p_i, \ldots, p_m)$; and $q=(q_1, q_2, \ldots, q_j, \ldots, q_n)$. The solution of calculating a minimum distance between the two pitch sequences by using the audio information matching algorithm in the embodiments of the disclosure mainly includes the following operations:

Operation (1): Calculate a distance matrix and a weight matrix of the sequence p and the sequence q.

In an embodiment of the disclosure, a position (i,j) in the distance matrix represents a distance d(i,j) between $p_i$ and $q_j$. If the distance is a Euclidean distance, $d(i,j)=(p_i-q_j)^2$.

In an embodiment of the disclosure, the weight matrix considers a distance between an element position (i,j) in the distance matrix and a diagonal (that is, a straight line formed by the point (1, 1) and the point (m, n)) of the distance matrix. If the sequence p and the sequence q are closer, a finally calculated optimal path from the start position (that is, the point (1, 1)) to the end position (that is, the point (m, n)) of the distance matrix is closer to the diagonal of the distance matrix. Therefore, penalty weights may be set for element positions far away from the diagonal. That is, when the element position is closer to the diagonal, the corresponding weight is smaller (closer to 1), and when the element position is farther from the diagonal, the corresponding weight is larger.

In an embodiment of the disclosure, a distance t(i, j) between the position (i, j) in the distance matrix and the diagonal of the distance matrix may be approximately:

$$t(i, j) = \frac{|i \times n - j \times m|}{\sqrt{n^2 + m^2}}.$$

In an embodiment of the disclosure, a calculation formula of the position (i,j) in the weight matrix is adaptive smoothing of t(i, j). That is, a weight w(i, j) corresponding to the position (i, j) in the distance matrix may be calculated by using the following Formula 1:

$$w(i,j)=[1+t(i,j)\times 0.025]\times[1+\log(1+t(i,j)\times 0.025)] \quad \text{Formula 1}$$

Values in Formula 1 are only used as an example.

Operation (2): Calculate a forward accumulation distance matrix, a forward source node matrix, a backward accumulation distance matrix, and a backward source node matrix according to the distance matrix and the weight matrix obtained in operation (1).

In an embodiment of the disclosure, the shortest distance is found by backtracking respectively from the start position and the end position to a middle position in the distance matrix. That is, an improved dynamic time warping (DTW) algorithm is proposed in the embodiments of the disclosure. By this algorithm, a bidirectional calculation may be performed to take into account head matching (or matching in a direction from a start position to a target position in a distance matrix) and tail matching (or matching in a direction from an end position to the target position in the distance matrix) of a sequence, so that the matching is more comprehensive.

In an embodiment of the disclosure, in a process of forward calculation from the start position in the distance matrix, to accelerate the process of distance accumulation and take into account the degree of deviation of the element position in the distance matrix from the diagonal (that is, the weight corresponding to the element position), the accumulation distance of the position (i,j) starts from three positions (i−1, j−1), (i−1, j−2), and (i−2, j−1), and a forward local decision function D_forward(i, j) may be defined as shown in the following Formula 2, which is used for representing the accumulation distance from the start position in the distance matrix to the position (i, j) in the distance matrix, to obtain the forward accumulation distance matrix.

$$D\_forward(i, j) = \min \begin{cases} D\_forward(i-1, j-1) + d(i-1, j-1) \times w(i-1, j-1), \\ D\_forward(i-1, j-2) + d(i-1, j-2) \times w(i-1, j-1), \\ D\_forward(i-2, j-1) + d(i-2, j-1) \times w(i-2, j-1) \end{cases} \quad \text{Formula 2}$$

Formula 2 may be adjusted to obtain the following Formula 3:

$$D\_forward(i, j) = \min \begin{cases} D\_forward(i-1, j-1) + d(i-1, j-1) \times \frac{w(i,j)^2}{w(i-1,j-1)}, \\ D\_forward(i-1, j-2) + d(i-1, j-2) \times \frac{1.5 \times w(i,j)^2}{w(i-1,j-2)}, \\ D\_forward(i-2, j-1) + d(i-2, j-1) \times \frac{1.5 \times w(i,j)^2}{w(i-2,j-1)} \end{cases} \quad \text{Formula 3}$$

In the foregoing embodiment, the forward calculation from the start position in the distance matrix starts from the lower left corner (1,1) of the distance matrix, and a calculation is performed in each row from left to right. While a forward accumulation distance D_forward(i, j) is calculated, a subscript, that is, one of (i−1, j−1), (i−1, j−2), and (i−2, j−1), of a source node of D_forward(i,j) is stored at the position (i,j) in the forward source node matrix.

In an embodiment of the disclosure, a process of backward calculation from the end position in the distance matrix is similar to the solution of forward calculation in the previous embodiment, except that the calculation direction starts from the end position in the distance matrix, that is, starts from a position (m,n) at the upper right corner of the distance matrix, and the accumulation distance of the position (i,j) starts from three positions (i+1, j+1), (i+1, j+2), and (i+2, j+1). The backward local decision function D_backward(i,j) is defined as shown in the following Formula 4, which is used for representing the accumulation distance from the end position in the distance matrix to the position (i,j) in the distance matrix, to obtain the backward accumulation distance matrix.

$$D\_backward(i, j) = \min \begin{cases} D\_backward(i+1, j+1) + d(i+1, j+1) \times w(i+1, j+1), \\ D\_backward(i+1, j+2) + d(i+1, j+2) \times w(i+1, j+1), \\ D\_backward(i+2, j+1) + d(i+2, j+1) \times w(i+2, j+1) \end{cases} \quad \text{Formula 4}$$

Formula 4 may be adjusted to obtain the following Formula 5:

$$D\_backward(i, j) = \min \begin{cases} D\_backward(i+1, j+1) + d(i+1, j+1) \times \frac{w(i,j)^2}{w(i+1,j+1)}, \\ D\_backward(i+1, j+2) + d(i+1, j+2) \times \frac{1.5 \times w(i,j)^2}{w(i+1,j+2)}, \\ D\_backward(i+2, j+1) + d(i+2, j+1) \times \frac{1.5 \times w(i,j)^2}{w(i+2,j+1)} \end{cases} \quad \text{Formula 5}$$

where w represents a weight value, and d represents a distance value.

In the foregoing embodiment, the backward calculation from the end position in the distance matrix starts from the upper right corner (m,n) of the distance matrix, and a calculation is performed from right to left in each row. While a backward accumulation distance D_backward(i,j) is calculated, a subscript, that is, one of (i+1, j+1), (i+1, j+2), and (i+2, j+1), of a source node of D_backward(i,j) is stored at the position (i,j) in the backward source node matrix.

Operation (3): Obtain the minimum distance and the shortest path from the forward accumulation distance matrix and the backward accumulation distance matrix.

In an embodiment of the disclosure, at any position (i,j) in the distance matrix, the shortest path connecting to (i,j) may be found from the lower left corner and the upper right corner, where a calculation formula of the shortest distance is shown in the following Formula 6:

$$D\_total(i,j)=d(i,j)\times w(i,j)+D\_forward(i,j)+D\_backward(i,j) \quad \text{Formula 6}$$

Based on Formula 6, the minimum distance min_dist is calculated by using the following Formula 7:

$$\min\_dist = \min_{i,j}\{D\_total(i, j)\} \quad \text{Formula 7}$$

Figure 11:
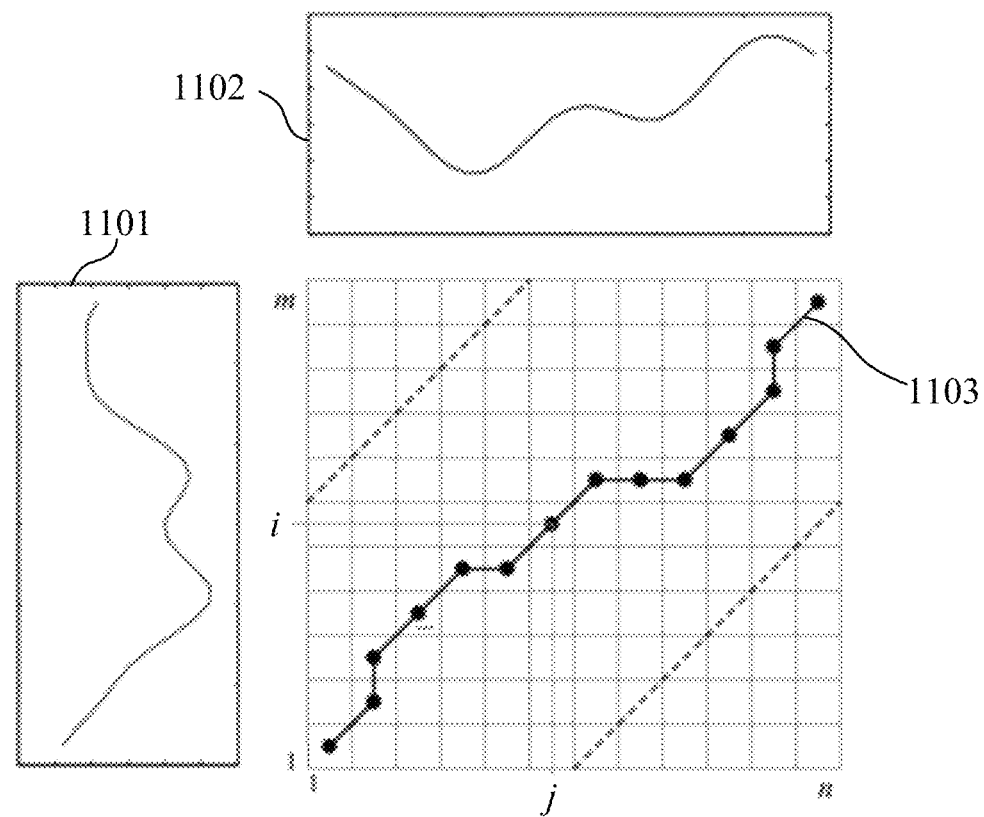
FIG. 11 is a schematic diagram of a global optimal path that is obtained according to an example embodiment of the disclosure.

The forward source node matrix and the backward source node matrix are found at the position corresponding to the minimum distance, and subscripts of previous nodes are obtained and traversed in turn to obtain a forward path (from (1,1) to (i,j)) and a backward path (from (m,n) to (i,j)). Based on the two paths, the minimum value of D_total (i,j) is the global optimal path corresponding to the minimum distance. For example, as shown in FIG. 11, the two pitch sequences are 1101 and 1102, and the global optimal path 1103 is finally obtained according to the technical solution of the embodiments of the disclosure.

The technical solutions in the embodiments of the disclosure take into consideration both the head priority matching (or head matching) and the tail priority matching (or tail matching) of the pitch sequence, so that the matching is more comprehensive. Moreover, when the accumulation distance is calculated, an offset between the position and the diagonal of the distance matrix is taken into account, which prevents the final optimal path from greatly deviating from the diagonal of the distance matrix, thereby making the sequence matching more robust.

The following describes apparatus embodiments of the disclosure, which may be used for performing the method for matching audio clips in the foregoing embodiments of the disclosure. For details not disclosed in the apparatus embodiments of the disclosure, reference may be made to the method for matching audio clips in the foregoing embodiments of the disclosure.

Figure 12:
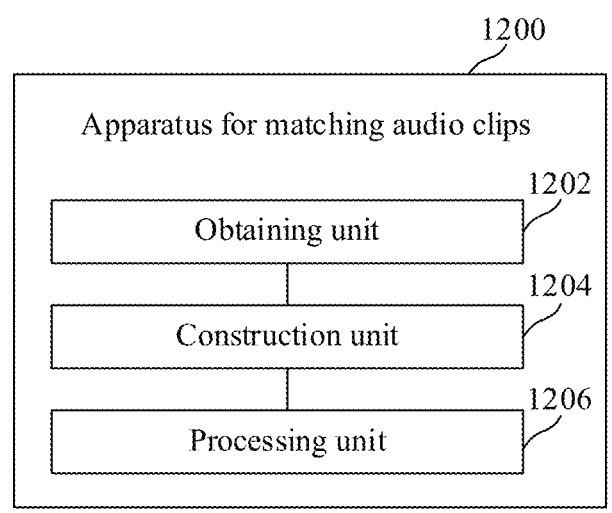
FIG. 12 is a block diagram of an apparatus for matching audio clips according to an example embodiment of the disclosure.

FIG. 12 is a block diagram of an apparatus for matching audio clips according to an embodiment of the disclosure.

Referring to FIG. 12, an apparatus 1200 for matching audio clips according to an embodiment of the disclosure includes an obtaining unit 1202, a construction unit 1204, and a processing unit 1206.

The obtaining unit 1202 is configured to obtain a first feature sequence corresponding to a first audio clip and a second feature sequence corresponding to a second audio clip.

The construction unit 1204 is configured to: obtain the first feature sequence and the second feature sequence from the obtaining unit 1202, and construct a distance matrix between the first feature sequence and the second feature sequence, each element in the distance matrix being used for representing a distance between a corresponding one of first positions and a corresponding one of second positions, the first positions being in the first feature sequence, the second positions being in the second feature sequence. In an embodiment of the disclosure, the first feature sequence and the second feature sequence are obtained for the same type of an audio feature, and the audio feature includes at least one of a pitch feature, a musical tone energy, a Mel-frequency cepstrum coefficient, and a root mean square energy value of each frame.

The processing unit 1206 is configured to: obtain the distance matrix from the construction unit 1204, and determine a first accumulation distance between a start position and a target position in the distance matrix and a second accumulation distance between an end position and the target position in the distance matrix; determine a minimum distance between the first feature sequence and the second feature sequence based on the first accumulation distance and the second accumulation distance; and determine a degree of matching between the first audio clip and the second audio clip according to the minimum distance. Based on a high degree of matching (that is, based on a determination that the audio clips match each other), the processing unit 1206 may perform a preset operation such as, for example but not limited to, query by humming or scoring by humming.

In an example embodiment, the processing unit 1206 includes:

a determining subunit, configured to determine accumulation distances between the start position and first candidate positions, the first candidate positions being located between the start position and the target position, the determining subunit being further configured to: determine first candidate accumulation distances between the start position and the target position according to the accumulation distances between the start position and the first candidate positions and distance values represented by values of the first candidate positions in the distance matrix; and determine a minimum value among the first candidate accumulation distances as the first accumulation distance.

In an example embodiment, the determining subunit is further configured to add the accumulation distances and the distance values represented by the first candidate positions to obtain distance sum values corresponding to the first candidate positions, the accumulation distances being distances between the start position and the first candidate positions; and the determining subunit is further configured to determine the distance sum values as the first candidate accumulation distances corresponding to the first candidate positions.

In an example embodiment, the determining subunit is further configured to perform a weighted calculation on the distance values represented by the first candidate positions according to the distance values represented by the first candidate positions and weight values corresponding to the first candidate positions, to obtain weighted distance values corresponding to the first candidate positions; and the determining subunit is further configured to: add the accumulation distances between the start position and the first candidate positions and the weighted distance values corresponding to the first candidate positions to obtain distance sum values corresponding to the first candidate positions, and determine the distance sum values as the first candidate accumulation distances corresponding to the first candidate positions.

In an example embodiment, the determining subunit is further configured to: determine distances between the first candidate positions and a diagonal of the distance matrix, the diagonal being a straight line connecting the start position and the end position; and determine the weight values corresponding to the first candidate positions according to the distances between the first candidate positions and the diagonal.

In an example embodiment, associations exist between the first candidate positions and the target position, the associations being used for indicating that the first candidate positions are located within a preset distance range around the target position.

In an example embodiment, the processing unit 1206 includes:
- a determining subunit, configured to determine accumulation distances between the end position and second candidate positions, the second candidate positions being located between the target position and the end position,
- the determining subunit being further configured to: determine second candidate accumulation distances between the end position and the target position according to the accumulation distances between the end position and the second candidate positions and distance values represented by values of the second candidate positions in the distance matrix; and determine a minimum value among the second candidate accumulation distances as the second accumulation distance.

In an example embodiment, associations exist between the second candidate positions and the target position, the associations being used for indicating that the second candidate positions are located within a preset distance range around the target position.

In an example embodiment, the processing unit 1206 includes:
- a determining subunit, configured to: determine minimum accumulation distances corresponding to the target position based on a distance value represented by a value of the target position in the distance matrix, the first accumulation distance, and the second accumulation distance; and select a minimum value from the minimum accumulation distances corresponding to the target position, and determine the minimum value as the minimum distance between the first feature sequence and the second feature sequence.

In an example embodiment, the determining subunit is further configured to add the distance value represented by the target position, the first accumulation distance, and the second accumulation distance to obtain the minimum accumulation distances corresponding to the target position; or
- the determining subunit is further configured to: perform a weighted calculation on the distance value represented by the target position and a weight value corresponding to the target position to obtain a weighted distance value corresponding to the target position; and add the weighted distance value, the first accumulation distance, and the second accumulation distance to obtain the minimum accumulation distances corresponding to the target position.

In an example embodiment, the first audio clip corresponds to n first feature sequences, and the second audio clip corresponds to n second feature sequences, n being a positive integer;
- the obtaining unit 1202 is further configured to obtain n minimum distances between the n first feature sequences and the n second feature sequences; and
- the processing unit 1206 is further configured to: perform a weighted summation on the n minimum distances to obtain a weighted distance value between the first audio clip and the second audio clip; and determine the degree of matching between the first audio clip and the second audio clip according to the weighted distance value.

In an example embodiment, based on the foregoing solution, the features of an audio clip include a pitch feature, a musical tone energy, a Mel-frequency cepstrum coefficient, and a root mean square energy value of each frame.

The obtaining unit 1202 may be implemented by a memory in a computer device, or by a processor in a computer device, or by a memory and a processor together; and the construction unit 1204 and the processing unit 1206 are implemented by a processor in a computer device.

Figure 13:
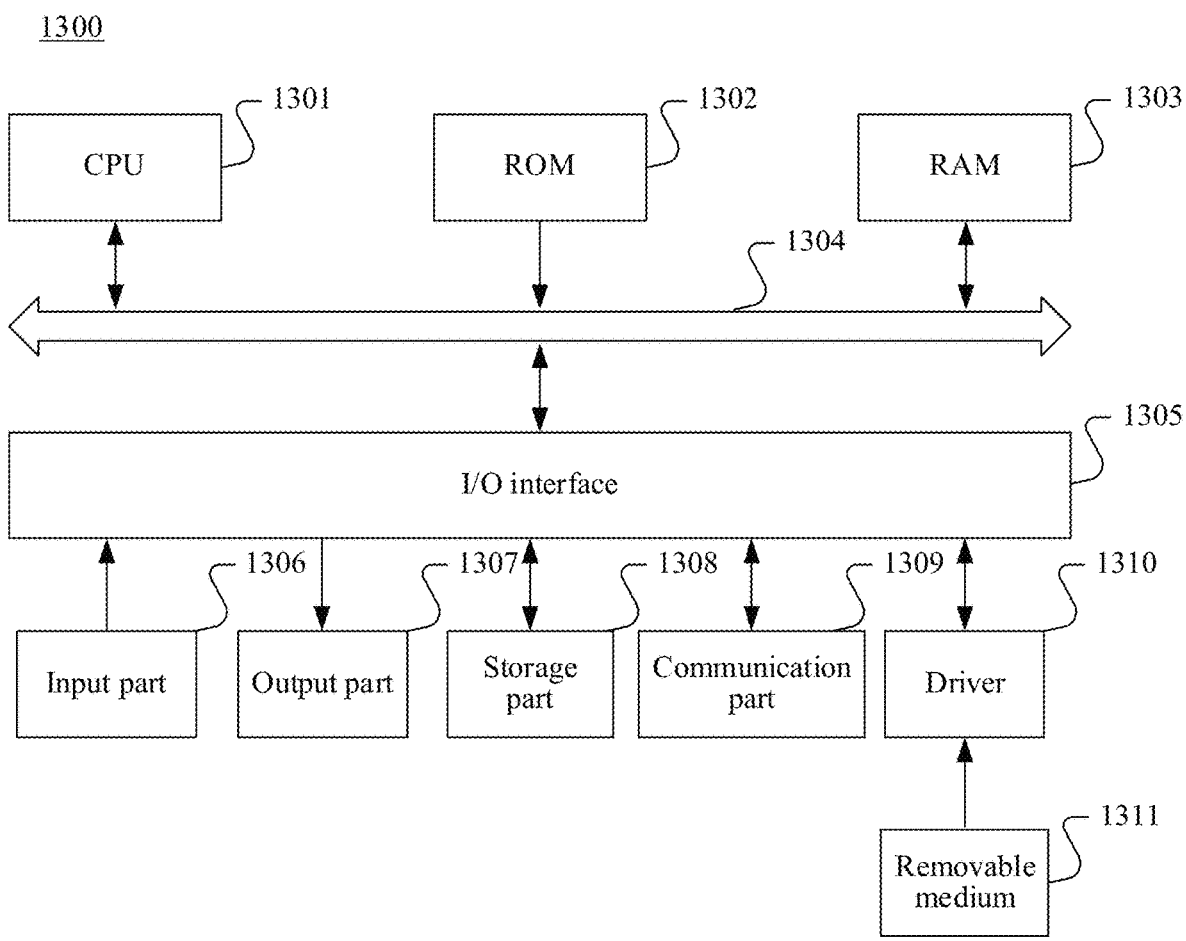
FIG. 13 is a schematic structural diagram of a computer system of an electronic device according to an example embodiment of the disclosure.

FIG. 13 is a schematic structural diagram of a computer system adapted to implement an electronic device according to an embodiment of the disclosure.

A computer system 1300 of the electronic device shown in FIG. 13 is merely an example, and does not constitute any limitation on functions and use ranges of the embodiments of the disclosure.

As shown in FIG. 13, the computer system 1300 includes a central processing unit (CPU) 1301, which may perform various suitable actions and processing based on a program stored in a read-only memory (ROM) 1302 or a program loaded from a storage part 1308 into a random access memory (RAM) 1303, for example, perform the method described in the foregoing embodiments. The RAM 1303 further stores various programs and data required for system operations. The CPU 1301, the ROM 1302, and the RAM 1303 are connected to each other through a bus 1304. An input/output (I/O) interface 1305 is also connected to the bus 1304.

The following components are connected to the I/O interface 1305: an input part 1306 including a keyboard, a mouse, or the like, an output part 1307 including a cathode ray tube (CRT), a liquid crystal display (LCD), a speaker, or the like, a storage part 1308 including a hard disk, or the like, and a communication part 1309 including a network interface card such as a local area network (LAN) card or a modem. The communication part 1309 performs communication processing by using a network such as the Internet. A driver 1310 is also connected to the I/O interface 1305 as required. A removable medium 1311, such as a magnetic disk, an optical disc, a magneto-optical disk, or a semiconductor memory, is installed on the drive 1310 as required, so that a computer program read from the removable medium is installed into the storage part 1308 as required.

Particularly, according to an embodiment of the disclosure, the processes described in the following by referring to the flowcharts may be implemented as computer software programs. For example, this embodiment of the disclosure includes a computer program product, the computer program product includes a computer program carried on a computer-readable medium, and the computer program includes program code used for performing the methods shown in the flowcharts. In such an embodiment, the computer program may be downloaded and installed from a network through the communication part 1309, and/or installed from the removable medium 1311. When the computer program is executed by the CPU 1301, the various functions defined in the system of the disclosure are executed.

The computer-readable medium shown in the embodiments of the disclosure may be a computer-readable signal medium or a computer-readable storage medium or any combination of the two. The computer-readable storage medium may be, for example, but is not limited to, an electric, magnetic, optical, electromagnetic, infrared, or semi-conductive system, apparatus, or component, or any combination of the above. A more specific example of the computer-readable storage medium may include but is not limited to: an electrical connection having one or more wires, a portable computer magnetic disk, a hard disk, a RAM, a ROM, an erasable programmable read-only memory (EPROM), a flash memory, an optical fiber, a compact disk read-only memory (CD-ROM), an optical storage device, a magnetic storage device, or any appropriate combination thereof. In the disclosure, the computer-readable storage medium may be any tangible medium containing or storing a program, and the program may be used by or used in combination with an instruction execution system, an apparatus, or a device. In the disclosure, a computer-readable signal medium may include a data signal being in a baseband or propagated as a part of a carrier wave, the data signal carrying computer-readable program code. A data signal propagated in such a way may assume a plurality of forms, including, but not limited to, an electromagnetic signal, an optical signal, or any appropriate combination thereof. The computer-readable signal medium may be further any computer readable medium in addition to a computer-readable storage medium. The computer readable medium may send, propagate, or transmit a program that is used by or used in conjunction with an instruction execution system, an apparatus, or a device. The program code included in the computer-readable medium may be transmitted by using any suitable medium, including but not limited to: a wireless medium, a wire, or the like, or any suitable combination thereof.

The flowcharts and block diagrams in the accompanying drawings illustrate possible system architectures, functions and operations that may be implemented by a system, a method, and a computer program product according to various embodiments of the disclosure. Each box in a flowchart or a block diagram may represent a module, a program segment, or a part of code. The module, the program segment, or the part of code includes one or more executable instructions used for implementing specified logic functions. In some implementations used as substitutes, functions annotated in boxes may alternatively occur in a sequence different from that annotated in an accompanying drawing. For example, two boxes shown in succession may be performed basically in parallel, and sometimes the two boxes may be performed in a reverse sequence. This is determined by a related function. Each box in a block diagram and/or a flowchart and a combination of boxes in the block diagram and/or the flowchart may be implemented by using a dedicated hardware-based system configured to perform a specified function or operation, or may be implemented by using a combination of dedicated hardware and a computer instruction.

A related unit described in the embodiments of the disclosure may be implemented in a software manner, or may be implemented in a hardware manner, and the unit described may also be set in a processor. Names of the units do not constitute a limitation on the units in a specific case.

According to another aspect, the disclosure further provides a computer-readable medium. The computer-readable medium may be included in the electronic device described in the foregoing embodiments, or may exist alone and is not disposed in the electronic device. The computer-readable medium carries one or more programs, the one or more programs, when executed by the electronic device, causing the electronic device to implement the method described in the foregoing embodiments.

Although a plurality of modules or units of a device configured to perform actions are discussed in the foregoing detailed description, such division is not mandatory. According to an example embodiment of the disclosure, the features and functions of two or more modules or units described above may be implemented in one module or unit. On the contrary, the features and functions of one module or unit described above may be further divided to be embodied by a plurality of modules or units.

According to the foregoing descriptions of the implementations, a person skilled in the art may readily understand that the example implementations described herein may be implemented by using software, or may be implemented by combining software and necessary hardware. Therefore, the technical solutions of the embodiments of the disclosure may be implemented in a form of a software product. The software product may be stored in a non-volatile storage medium (which may be a CD-ROM, a USB flash drive, a removable hard disk, or the like) or on the network, including several instructions for instructing a computing device (which may be a personal computer, a server, a touch terminal, a network device, or the like) to perform the methods according to the embodiments of the disclosure.

The technical solutions provided in the embodiments of the disclosure achieve at least the following beneficial effects.

A first accumulation distance between a start position in a distance matrix and a target position in the distance matrix and a second accumulation distance between an end position and the target position in the distance matrix are calculated, to obtain a minimum distance between the first feature sequence and the second feature sequence based on the first accumulation distance and the second accumulation distance. Therefore, a minimum distance between two feature sequences may be comprehensively calculated in two directions (that is, a direction from a start position to a target position in a distance matrix and a direction from an end position to the target position in the distance matrix), so that matching relationships between the feature sequences in the two directions are both taken into account, and it may be ensured that the calculated minimum distance between the two feature sequences is more accurate, which improves the accuracy of matching audio clips.

At least one of the components, elements, modules or units described herein may be embodied as various numbers of hardware, software and/or firmware structures that execute respective functions described above, according to an example embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or unit. Further, although a bus is not illustrated in the above block diagrams, communication between the components, elements or units may be performed through the bus. Functional aspects of the above example embodiments may be implemented in algorithms that execute on one or more processors. Furthermore, the components, elements or units represented by a block or processing operations may employ any number of related art techniques for electronics configuration, signal processing and/or control, data processing and the like.

After considering the specification and practicing the implementations of the present disclosure, a person skilled in the art may easily conceive of other implementations of the disclosure. The disclosure is intended to cover any variations, uses, or adaptive changes of the disclosure. These variations, uses, or adaptive changes follow the general principles of the disclosure and include common general knowledge or common technical means in the art, which are not disclosed in the disclosure.

It is to be understood that the disclosure is not limited to the precise structures described above and shown in the accompanying drawings, and various modifications and changes may be made without departing from the scope of the disclosure. The scope of the disclosure is subject only to the appended claims.

What is claimed is:

1. A method for matching audio clips, performed by a computer device, the method comprising:
    obtaining a first feature sequence corresponding to a first audio clip and a second feature sequence corresponding to a second audio clip;
    constructing a distance matrix between the first feature sequence and the second feature sequence, elements in the distance matrix representing respective distances between first positions in the first feature sequence and second positions in the second feature sequence;
    determining a first accumulation distance between a start position and a target position in the distance matrix and a second accumulation distance between an end position and the target position in the distance matrix;
    determining a minimum distance between the first feature sequence and the second feature sequence based on the first accumulation distance and the second accumulation distance; and
    determining a degree of matching between the first audio clip and the second audio clip according to the minimum distance,
    wherein the determining the first accumulation distance comprises:
    adding an accumulation distance of a first candidate position and a distance value represented by the first candidate position in the distance matrix, to obtain a distance sum value corresponding to the first candidate position, the first candidate position being located between the start position and the target position in the distance matrix; and
    determining the first accumulation distance based on the distance sum value corresponding to the first candidate position.

2. The method according to claim 1, wherein the determining the first accumulation distance further comprises:
    determining accumulation distances between the start position and first candidate positions, the first candidate positions being located between the start position and the target position in the distance matrix;
    determining first candidate accumulation distances between the start position and the target position, each of the first candidate accumulation distances being based on an accumulation distance between the start position and a corresponding first candidate position and a distance value represented by the corresponding first candidate position in the distance matrix; and
    determining, as the first accumulation distance, a minimum value among the first candidate accumulation distances.

3. The method according to claim 2, wherein the determining the first candidate accumulation distances comprises, with respect to each of the first candidate positions:
    adding the accumulation distance between the start position and the corresponding first candidate position and the distance value represented by the corresponding first candidate position to obtain a distance sum value of the corresponding first candidate position, the accumulation distance of the corresponding first candidate position being based on distances between the start position and previous positions of the corresponding first candidate position, the previous positions being located between the start position and the corresponding first candidate position in the distance matrix; and
    determining the distance sum value as a first candidate accumulation distance of the corresponding first candidate position.

4. The method according to claim 2, wherein the determining the first candidate accumulation distances comprises, with respect to each of the first candidate positions:
    performing a weighted calculation on the distance value represented by the corresponding first candidate position by using a weight value of the corresponding first candidate position, to obtain a weighted distance value of the corresponding first candidate position;
    adding the accumulation distance between the start position and the corresponding first candidate position and the weighted distance value of the corresponding first candidate position to obtain a distance sum value of the corresponding first candidate position, the accumulation distance of the corresponding first candidate position being based on distances between the start position and previous positions of the corresponding first candidate position, the previous positions being located between the start position and the corresponding first candidate position in the distance matrix; and
    determining the distance sum value as a first candidate accumulation distance of the corresponding first candidate position.

5. The method according to claim 4, further comprising, prior to the determining the distance sum value as the first candidate accumulation distance of the corresponding first candidate position:
    determining a distance between the corresponding first candidate position and a diagonal of the distance matrix, the diagonal being a straight line connecting the start position and the end position; and
    determining the weight value of the corresponding first candidate position according to the distance between the corresponding first candidate position and the diagonal.

6. The method according to claim 2, wherein
    the first candidate positions are located within a preset distance range around the target position.

7. The method according to claim 1, wherein the calculating the second accumulation distance comprises:
- determining accumulation distances between the end position and second candidate positions, the second candidate positions being located between the target position and the end position in the distance matrix;
- determining second candidate accumulation distances between the end position and the target position, each of the first candidate accumulation distances being based on an accumulation distance between the end position and a corresponding second candidate position and a distance value represented by the corresponding second candidate position in the distance matrix; and
- determining, as the second accumulation distance, a minimum value among the second candidate accumulation distances.

8. The method according to claim 7, wherein
the second candidate positions are located within a preset distance range around the target position.

9. The method according to claim 1, wherein the determining the minimum distance comprises:
- adding a distance value represented by the target position in the distance matrix, the first accumulation distance, and the second accumulation distance, to obtain the minimum distance.

10. The method according to claim 1, wherein the determining the minimum distance comprises:
- adding a weighted distance value represented by the target position in the distance matrix, the first accumulation distance, and the second accumulation distance, to obtain the minimum distance.

11. The method according to claim 1, wherein the first audio clip corresponds to n first feature sequences, and the second audio clip corresponds to n second feature sequences, n being a positive integer; and
the determining the degree of matching comprises:
- obtaining n minimum distances between the n first feature sequences and the n second feature sequences;
- performing a weighted summation on the n minimum distances to obtain a weighted distance value between the first audio clip and the second audio clip; and
- determining the degree of matching between the first audio clip and the second audio clip according to the weighted distance value.

12. An apparatus for matching audio clips, comprising:
- at least one memory configured to store program code; and
- at least one processor configured to read the program code and operate as instructed by the program code, the program code comprising:
- obtaining code configured to cause the at least one processor to obtain a first feature sequence corresponding to a first audio clip and a second feature sequence corresponding to a second audio clip;
- construction code configured to cause the at least one processor to: construct a distance matrix between the first feature sequence and the second feature sequence, elements in the distance matrix representing respective distances between first positions in the first feature sequence and second positions in the second feature sequence; and
- processing code configured to cause the at least one processor to: determine a first accumulation distance between a start position and a target position in the distance matrix and a second accumulation distance between an end position and the target position in the distance matrix; determine a minimum distance between the first feature sequence and the second feature sequence based on the first accumulation distance and the second accumulation distance; and determine a degree of matching between the first audio clip and the second audio clip according to the minimum distance, wherein the processing code is further configured to cause the at least one processor to:
- add an accumulation distance of a first candidate position and a distance value represented by the first candidate position in the distance matrix, to obtain a distance sum value corresponding to the first candidate position, the first candidate position being located between the start position and the target position in the distance matrix; and
- determine the first accumulation distance based on the distance sum value corresponding to the first candidate position.

13. The apparatus according to claim 12, wherein the processing code comprises:
- first determining code configured to cause the at least one processor to determine accumulation distances between the start position and first candidate positions, the first candidate positions being located between the start position and the target position in the distance matrix;
- second determining code configured to cause the at least one processor to determine first candidate accumulation distances between the start position and the target position, each of the first candidate accumulation distances being based on an accumulation distance between the start position and a corresponding first candidate position and a distance value represented by the corresponding first candidate position in the distance matrix; and
- third determining code configured to cause the at least one processor to determine, as the first accumulation distance, a minimum value among the first candidate accumulation distances.

14. The apparatus according to claim 13, wherein the second determining code is further configured to cause the at least one processor to, with respect to each of the first candidate positions:
- add the accumulation distance between the start position and the corresponding first candidate position and the distance value represented by the corresponding first candidate position, to obtain a distance sum value of the corresponding first candidate position, the accumulation distance of the corresponding first candidate position being based on distances between the start position and previous positions of the corresponding first candidate position, the previous positions being located between the start position and the corresponding first candidate position in the distance matrix; and
- determine the distance sum value as a first candidate accumulation distance of the corresponding first candidate position.

15. The apparatus according to claim 13, wherein the second determining code is further configured to cause the at least one processor to, with respect to each of the first candidate positions:
- perform a weighted calculation on the distance value represented by the corresponding first candidate position and a weight value of the corresponding first candidate position, to obtain a weighted distance value of the corresponding first candidate position;
- add the accumulation distance between the start position and the corresponding first candidate position and the weighted distance value of the corresponding first candidate position to obtain a distance sum value of the corresponding first candidate position, the accumulation distance of the corresponding first candidate position being based on distances between the start position and previous positions of the corresponding first candidate position, the previous positions being located between the start position and the corresponding first candidate position in the distance matrix; and determine the distance sum value as a first candidate accumulation distance of the corresponding first candidate position.

16. The apparatus according to claim 15, wherein the second determining code is further configured to cause the at least one processor to, prior to the determining the distance sum value as the first candidate accumulation distance of the corresponding first candidate position:

determine a distance between the corresponding first candidate position and a diagonal of the distance matrix, the diagonal being a straight line connecting the start position and the end position; and determine the weight value of the corresponding first candidate position according to the distance between the corresponding first candidate position and the diagonal.

17. The apparatus according to claim 13, wherein the first candidate positions are located within a preset distance range around the target position.

18. The apparatus according to claim 12, wherein the processing code further comprises:

fourth determining code configured to cause the at least one processor to determine accumulation distances between the end position and second candidate positions, the second candidate positions being located between the target position and the end position in the distance matrix;

fifth determining code configured to cause the at least one processor to determine second candidate accumulation distances between the end position and the target position, each of the first candidate accumulation distances being based on an accumulation distance between the end position and a corresponding second candidate position and a distance value represented by the corresponding second candidate position in the distance matrix; and sixth determining code configured to cause the at least one processor to determine, as the second accumulation distance, a minimum value among the second candidate accumulation distances.

19. ~~A non transitory~~ A non-transitory computer-readable medium, storing a computer program, the computer program being executable by at least one processor to perform:

obtaining a first feature sequence corresponding to a first audio clip and a second feature sequence corresponding to a second audio clip;

constructing a distance matrix between the first feature sequence and the second feature sequence, elements in the distance matrix representing respective distances between first positions in the first feature sequence and second positions in the second feature sequence;

determining a first accumulation distance between a start position and a target position in the distance matrix and a second accumulation distance between an end position and the target position in the distance matrix;

determining a minimum distance between the first feature sequence and the second feature sequence based on the first accumulation distance and the second accumulation distance; and determining a degree of matching between the first audio clip and the second audio clip according to the minimum distance;

wherein the determining the first accumulation distance comprises:

adding an accumulation distance of a first candidate position and a distance value represented by the first candidate position in the distance matrix, to obtain a distance sum value corresponding to the first candidate position, the first candidate position being located between the start position and the target position in the distance matrix; and determining the first accumulation distance based on the distance sum value corresponding to the first candidate position.

20. An electronic device, comprising:

one or more processors; and a storage apparatus, configured to store one or more programs, the one or more programs being executable by the one or more processors to perform the method according to claim 1.

* * * * *